United States Patent [19]

Holsworth

[11] Patent Number: 4,535,221
[45] Date of Patent: Aug. 13, 1985

[54] ELECTRICALLY HEATED STEERING WHEEL WITH ADHESIVELY ATTACHED FOIL STRIP HEATING ELEMENT

[76] Inventor: Herbert Holsworth, 1267 Muskingum, Pontiac, Mich. 48054

[21] Appl. No.: 510,275

[22] Filed: Jul. 1, 1983

[51] Int. Cl.³ .......................... H05B 3/34; B62D 1/10
[52] U.S. Cl. .................................... 219/204; 74/552; 74/558; 219/535; 219/536; 219/542; 219/543; 338/212
[58] Field of Search ............... 219/203, 204, 535, 548, 219/549, 544, 526, 536, 542, 543; 338/212; 74/552, 558

[56] References Cited

U.S. PATENT DOCUMENTS

| | | | |
|---|---|---|---|
| 1,125,889 | 1/1915 | Smith | 219/204 X |
| 1,546,413 | 7/1925 | Solomon | 219/204 |
| 1,934,988 | 11/1933 | May | 219/204 |
| 2,392,539 | 1/1946 | Leible | 219/204 |
| 2,530,559 | 11/1950 | Wilson | 219/204 |
| 2,537,606 | 1/1951 | Steppan | 219/204 |
| 2,662,961 | 12/1953 | Sargent | 219/204 |
| 2,812,412 | 11/1957 | Fulham | 219/204 |
| 2,835,777 | 5/1958 | Gates et al. | 219/204 |
| 3,165,620 | 1/1965 | Miller | 219/204 |
| 3,757,087 | 9/1973 | Bernard | 219/543 X |
| 3,798,419 | 3/1974 | Maake | 219/544 X |
| 4,063,068 | 12/1977 | Johnson et al. | 219/543 |

FOREIGN PATENT DOCUMENTS

| | | | |
|---|---|---|---|
| 976805 | 11/1950 | France | 219/204 |
| 1580666 | 12/1980 | United Kingdom | 219/203 |

*Primary Examiner*—Anthony Bartis
*Attorney, Agent, or Firm*—John R. Benefiel

[57] ABSTRACT

A steering wheel having cross spokes and mounted for rotation on a steering column is provided with an electric heating arrangement including a thin strip of metal foil adhesively bonded to and extending substantially about the entire outer periphery of the wheel. The outer surface of the foil strip is coated with an electrically insulating plastic film and a protective cover is disposed over the foil strip and steering wheel outer periphery and secured by lacing. A control switch mounted on one of the spokes is connected to the foil strip by power supply leads extending along the spoke. A current limiting resistance element is interposed intermediate the length of the metal foil strip to insure moderate current levels therethrough and is carried by another spoke of the wheel.

4 Claims, 9 Drawing Figures

4,535,221

ELECTRICALLY HEATED STEERING WHEEL WITH ADHESIVELY ATTACHED FOIL STRIP HEATING ELEMENT

BACKGROUND DISCUSSION

This invention relates to heater arrangements for automotive vehicles of the type adapted to warm the steering wheel during cold weather. It has long been considered desirable to have an arrangement for heating steering wheels of automotive vehicles.

Hand contact with the steering wheel by the operator during cold weather vehicle operation is uncomfortable until sufficient warming of the passenger compartment has taken place. This discomfort is acute to those persons who suffer from arthritis and other disease conditions of the hands.

A number of attempts have been made to provide such a steering wheel heater. The usual approach has involved the use of lengths of resistance wire as heating elements, which are embedded within the steering wheel or extend within a hollow steering wheel. In some instances, a metallic coating applied over the surface of the steering wheel has been employed as a resistance heating element. An electrical current is then arranged to be passed through the resistance wire. Such prior art arrangements, however, have not been successful due to various factors. Some of these prior art arrangements are complex and require major structural modifications of the steering wheel itself which unduly adds to the cost of manufacture. A further difficulty is inherent in the use of a resistance wire which is not well suited to the extreme temperature variations and the flexing and stressing of the steering wheel during steering maneuvers. The durability of such wire in use has not been found to be satisfactory.

Accordingly, it is an object of the present invention to provide an arrangment for heating steering wheels, which is simple and yet effective and can be adapted to an existing steering wheel design without major modifications.

It is a further object of the present invention to provide such heated steering wheel in which the heater arrangement is durable and easily able to withstand the stressing involved in executing steering maneuvers and the wide temperature ranges occurring over a period of cold and warm weather vehicle operation.

SUMMARY OF THE INVENTION

These and other objects of the present invention, which will become apparent upon a reading of the following specification and claims, are achieved by the use of adhesive foil strip heating element which is applied, in a first version, to the surface periphery of the steering wheel with a steering wheel cover optionally applied in order to protect the heating tape element.

In another version, a groove is recessed within the steering wheel periphery and the heater tape element disposed within the groove with a snap-in bead molding received within the groove and present a smooth outer surface. Electrical power is supplied to the heater element by means of a contact ring carried by the steering wheel, with a stationary slider contact in engagement with the undersurface thereof. An electrical lead is connected to a control switch mounted to a steering wheel spoke, the switch output connected to one side of the heater element. The opposite end of the heater element is secured to a ground in a typical automotive power supply circuit. Another steering wheel spoke houses a current limiting resistance which is connected in series with two segments of heater foil strips to protect against excessive current flow through the heater tape. A fuse may also be installed in series to prevent excessive current in the supply circuit.

For open spoke, sports car-type steering wheels, a pair of housings are mounted on the undersides of the steering wheel spokes receiving the wire connections to the heater element and also the current limiting resistance. The on/off switch is mounted within one of the housings.

DETAILED DESCRIPTION

Figure 1:
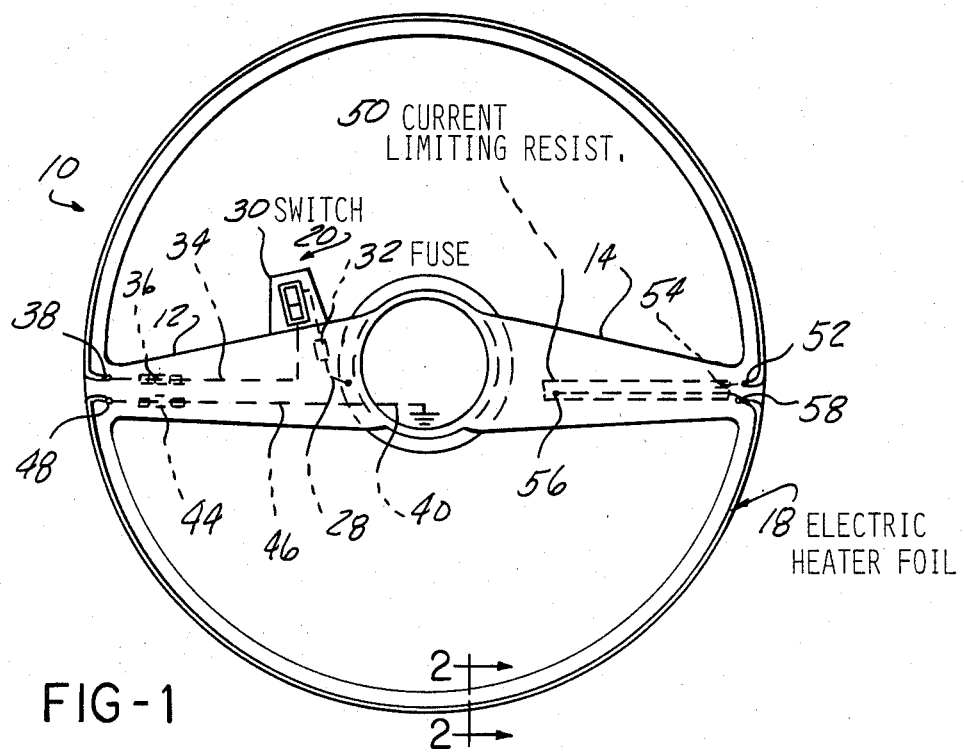
FIG. 1 is a plan view of the steering wheel with a partially schematic electrical circuit diagram showing the installation of the heater foil strip element and power supply circuit components according to the present invention.

In the following detailed description, certain specific terminology will be employed for the sake of clarity and a particular embodiment described in accordance with the requirements of 35 USC 112, but it is to be understood that the same is not limiting and indeed should not be so construed inasmuch as the invention is capable of taking many forms and variations within the scope of the appended claims.

Referring to the drawings and particularly FIGS. 1-4, the present arrangement is intended to provide a means for heating a conventional steering wheel 10 of a generally circular configuration and including a plurality of cross spokes as indicated at 12 and 14. The steering wheel 10 is mounted for rotation on a stationary steering column 16, all in conventional fashion.

Figure 2:
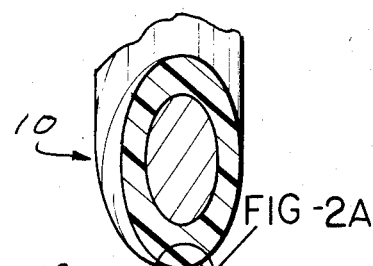
FIG. 2 is a sectional view taken along the lines 2—2 of the steering wheel in FIG. 1 showing an enlarged sectional view showing the installation of the heater tape element.

According to the concept of the present invention, the heating arrangement includes a strip of metallic foil 18 which is adhesively bonded about the periphery of the steering wheel 10, as best seen in FIG. 2. The thin metallic foil is of a configuration as generally disclosed in U.S. Pat. No. 3,757,087 and is commercially available. This takes the form of a multi-layer strip including a strip of metallic foil such as aluminum 0.006 inch thick and approximately ⅜ inch wide.

Figure 2A:
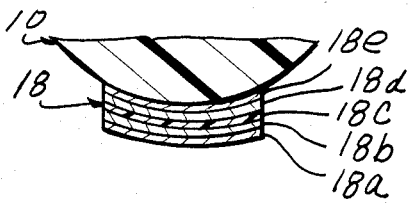
FIG. 2a is an enlarged view of the encircled portion of the view of FIG. 2.
Figure 3:
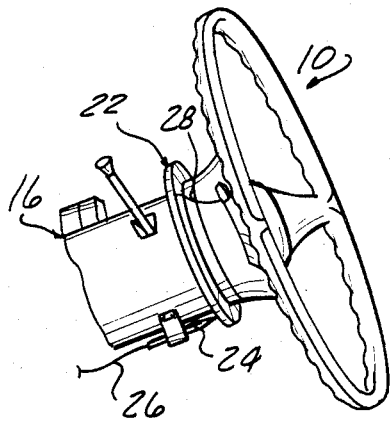
FIG. 3 is a fragmentary, perspective view of a steering wheel and column illustrating the installation of the contact ring and slider contact associated with the power supply circuit of the heated steering wheel arrangement shown in FIG. 1.
Figure 4:
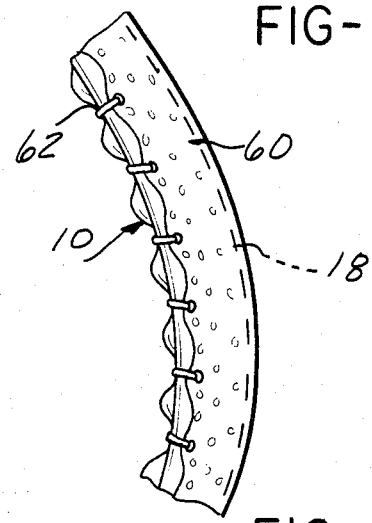
FIG. 4 is a fragmentary view of the steering wheel showing the installation of a steering wheel cover.
Figure 8:
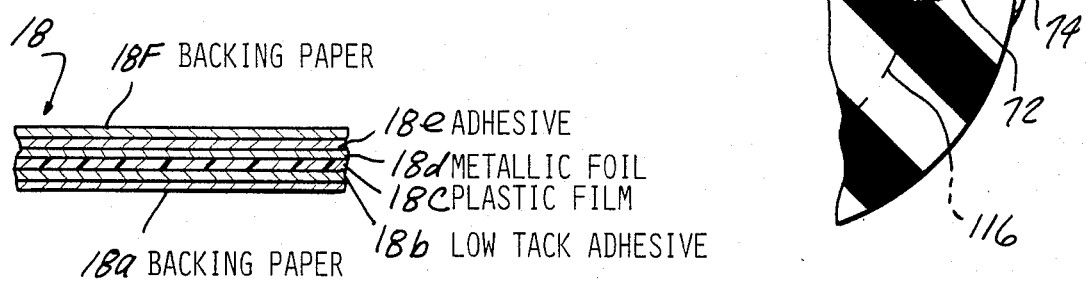
FIG. 8 is an enlarged sectional view of the foil structure heating element.

Referring to FIGS. 2a and 8, one surface of the foil 18d covered with a plastic insulating film 18c in turn covered by a layer of mild adhesive 18b to retain the backing paper 18b removed at installation. The other side of the metallic foil 18d is provided with a layer of relatively strong adhesive material 18e with a backing paper 18f also applied to this surface. The adhesive disclosed in that patent is thermo-setting such that upon heating during the initial energization of the heating arrangement, the adhesive cures to form a strong bond to the perimeter of the steering wheel 10.

The peripheral surface of the steering wheel is an outer surface which is electrically insulated to avoid grounding of the electrical current. The outer backing is peeled away, the backing paper providing structural support for the thin metal foil which also may be used to support a cardboard backing element which is wax bonded to the outer layer, which wax bonding is neutralized by the initial heating cycle to enable its removal. The resultant metal foil 18 bonded to the periphery of the steering wheel 10 had been found to provide a very effective and durable yet easily installed heater element which sustains wide variations in temperature, as well as the deflection of the steering wheel incidental to executing steering maneuvers.

The power supply circuit, generally indicated at 20, provides means for causing a current to be passed through the strip of metal foil 18 and includes a contact ring 22 affixed to the steering wheel 10 such as to be rotatable therewith during steering. A slider contact 24 is mounted to the stationary steering column 16 in such a way as to be in wiping contact with the contact surface of the wiper ring 22. The slider contact 24 in turn is connected via lead 26 to a source of vehicle power such as the vehicle battery-alternator power supply.

A suitable lead 28 is connected to the contact ring 22 and in turn electrically connected to a control switch 30 mounted to one of the cross spokes of the steering wheel 10. A fuse 32 may be included in series with the lead 28 and contact switch 30 as shown in FIG. 1. The switch 30 controls the electrical connection of the power supply circuit 20 to one side of the strip of metallic foil 18. The metallic foil strip 18 is connected electrically to the other side of the control switch 30 by means of an electrical lead 34 passing within the interior of the spoke 12 to a terminal 36 with the lead 34 soldered to one end and the metallic strip 18 connected to the other end. The metallic strip 18 passes through a small opening 38 and passes into the interior of the cross spoke 12. The opposite end of the strip of metallic foil 18 is connected to a suitable ground connection 40 such as with hub 42 of the steering wheel 10, in well known fashion. This connection is achieved by connection with a terminal tab 44, having soldered thereto a ground lead 46 at one end, and the other end of the strip of metallic foil soldered to the tab 44 and also passing through a small bore opening 48 to pass into the interior of the steering wheel spoke 12.

In order to prevent excessive current flow through the thin metallic foil strip 18, a current limiting resistance 50 is mounted within the opposite spoke 14 and intermediate the length of the metallic foil 18. Resistance 50 is electrically connected intermediate the length of the strip of metallic foil 18, with an intermediate end thereof passing through a small opening 52 and thence into the interior of the spoke 14, with a solder connection 54 or other suitable electrical connection 54 connecting one end of the current limiting resistance 50 to the intermediate end of the strip of metallic foil 18. The other end of the current limiting resistance 50 electrially connected thereto at 56 to the other end of the strip of metallic foil 18. The other end of strip 18 passes out through a small opening 58 and thence onto the surface of the steering wheel and bonded to the peripheral surface thereof. While such a strip of thin metallic foil 18 so mounted has been found to be reasonably durable, it has been found advantageous to install a cover 60 to the exterior of the steering wheel 10. The cover 60 may be of a well-known type, secured by a lacing 62 and looped about the inside surfaces of the steering wheel. This provides the effect of evening out of the heating achieved upon passage of the current through the strip of metallic foil 18, and also reduces the effects of wear by direct contact with the metallic foil 18.

It can be appreciated that this arrangement can easily be added to existing steering wheels by the provision of a kit as an add-on accessory.

Figure 5:
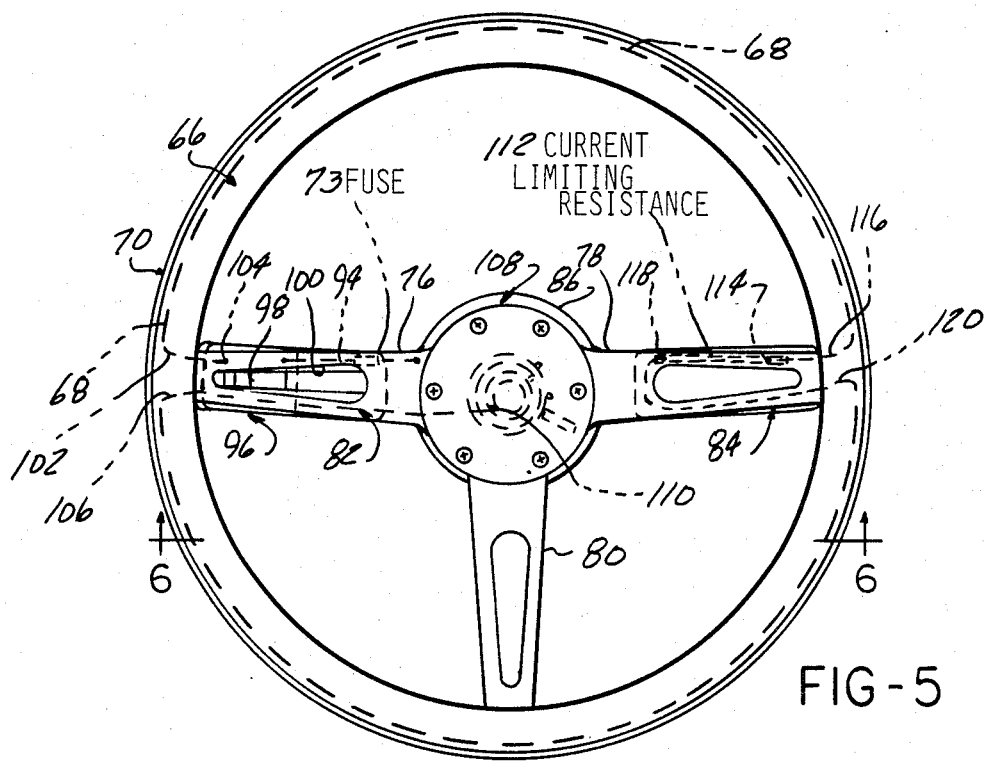
FIG. 5 is a plan view of a steering wheel supplied with a sports-type steering wheel with a heater arrangement according to the present invention.
Figure 6:
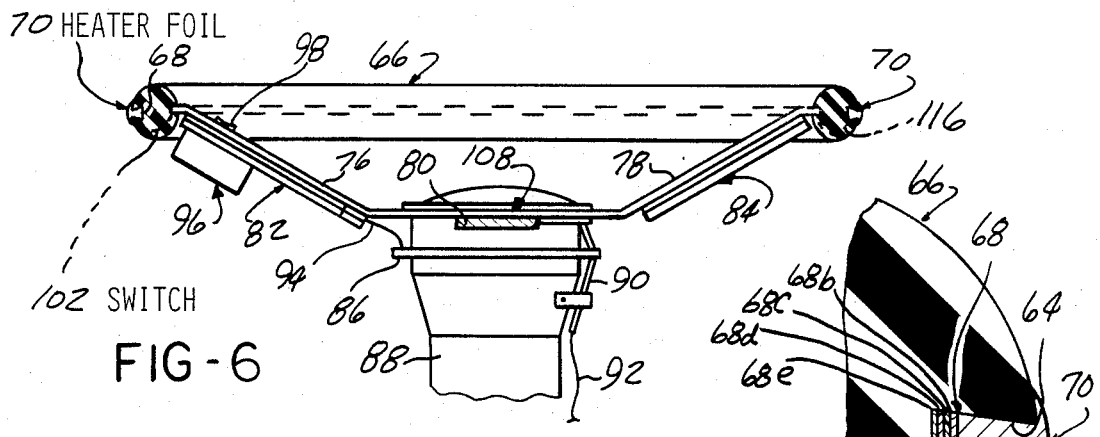
FIG. 6 is a sectional view of the steering wheel shown in FIG. 5 with a fragmentary view of the steering column to which the steering wheel is mounted.
Figure 7:
FIG. 7 is an enlarged sectional view of the steering wheel rim of the heated steering wheel shown in FIGS. 5 and 6.

An alternate arrangement for installation on sports car-type steering wheels is shown in FIGS. 5–7. This arrangement also eliminates the need for an exterior cover for the steering wheel.

In the arrangement shown in FIGS. 5–7 there is initially formed a peripheral groove 64 routed or otherwise formed into the periphery of the steering wheel 66, the groove 64 preferably having sloping sides, as best seen in FIG. 7. A thin metallic foil 68 is then installed in the bottom of the groove 64. The foil layer 68d may be comprised of adhesive layers 68b and 68e after removal of backing paper layers, with a remaining thin plastic film layer 68c. A trim strip 70 is thereafter snapfitted into the groove 64 by means of retainer portions 72 with a smooth bead trim portion 74 presenting a smooth attractive appearance of the perimeter of the wheel to thus cover the groove and heating strip 68. Sport-type steering wheels 66 are often provided with open-type spokes 76, 78, and 80. In this case, the power supply circuitry 20 is adapted to be mounted within housings 82 and 84 connected to the underside to the spokes 76 and 78. As in the previously described embodiments, the power supply circuit 20 includes a contact ring 86 mounted to the steering wheel 66 such as to be rotated together therewith. The steering wheel 66 is mounted on a stationary steering column 88 and mounted on the steering column 88 is a slider contact 90 with a lead 92 connected to a source of power supply as before. The slider contact 90 is in wiping engagement with the underside of the contact ring 86. A suitable lead 94 is electrically connected to the contact ring 86 and passes within the interior of the housing 82 mounted as by screws (not shown) to the spoke 76. The interior of the housing 82 is hollow to receive the power lead 94.

Also mounted to the housing 82 is a control switch 96 having an on/off button 98 protruding up between the opening 100 formed in the spoke 76 to enable ready access thereto for turning on and off the heater arrangement according to the present invention.

One end of the strip of metallic foil 68 extends through a groove 102 and thence into the interior of the housing 82 and connected to the terminal of the switch 96. The opposite end of the strip of metallic foil 68 also passes through a groove indicated at 106 and then to the interior of the housing 82 passing therethrough into the interior of the steering wheel hub 108 to be suitably grounded at 110. The housing 84 mounts the current limiting resistor 112 within its interior with one end of the strip of metallic foil 68 electrically connected thereto at 114 with the strip of metallic foil 68 passing within a groove 116 and into the interior of the housing 84. The opposite end of the strip of metallic foil 68 of the intermediate end is also electrically connected at 118 to the current limiting resistor 112 and passing out through a groove 120 to the groove 64.

Accordingly, it can be appreciated that the arrangement provides the neat finished appearance to the steering wheel, even for open steering wheel constructions as are used to obtain a sports car look. This arrangement, likewise, dispenses with the need for an externally applied cover, and yet provides a durable finished appearance thereto.

It can also be appreciated that many variations over the described embodiments are possible.

I claim:

1. In combination with a generally circular steering wheel having cross spokes, and mounted for rotation on a steering column, a heater arrangement comprising:
   a strip of metal foil adhesively bonded to and extending substantially entirely about the outer periphery of said steering wheel, the outer surface of said metal foil coated with an insulating plastic film, said strip of metal foil being adhesively bonded directly to the surface of said steering wheel, and further including a cover disposed over said foil strip and said steering wheel outer periphery;
   power supply means for causing an electrical current to be passed through said strip of metal foil, including a switch mounted to one of said spokes and power supply leads extending along said spoke and electrically connected to the ends of said strip of metal foil, whereby electrical current passed through said metal foil causes heating of said steering wheel.

2. The combination according to claim 1 further including a current limiting resistance element electrically interposed intermediate the length of said strip of metal foil.

3. The combination according to claim 2, wherein said current limiting resistance element is carried within another of said spokes of said steering wheel.

4. The combination according to claim 1 wherein said power supply means includes a contact ring mounted for rotation with said steering wheel and further including a stationary slider contact in sliding engagement with said ring, said contact ring electrically connected to a power source.

* * * * *